United States Patent Office 3,655,633
Patented Apr. 11, 1972

3,655,633
METHOD OF SILYLATING ORGANIC VINYLIC POLYMERS

John C. Saam, Midland, Mich., assignor to Dow Corning Corporation, Midland, Mich.
No Drawing. Filed Aug. 25, 1970, Ser. No. 66,894
Int. Cl. C08g 23/00
U.S. Cl. 260—79
10 Claims

ABSTRACT OF THE DISCLOSURE

Polymerizing organic vinylic monomers by means of free radical initiation in the presence of organosilicon compounds having a chain transfer constant greater than $10^{-3}$ is a useful method for silylating organic vinylic polymers.

---

This invention relates to making organic vinylic polymers having functional organosilyl groups thereon.

The introduction of silicon functional groups into organic vinylic polymers is desirable to add versatility to the usefulness of organic vinylic polymers. The use of hydrolyzable functional silicon groups introduces the ability of the organic vinylic polymer to be cross-linked at room temperature. Thus, an object of the present invention is to provide a method for introducing organosilyl groups into organic vinyl polymers. This object and other objects will become apparent from the following detailed description of the present invention.

This invention relates to a method of silylating organic vinylic polymers comprising polymerizing organic vinylic monomers by means of free radical initiation in the presence of a compound selected from the group consisting of an organosilicon compound of the formula $X_{3-x}R'_xSiRY$ and $(X_{3-x}R'_xSiRS)_2$ in which R' is a monovalent hydrocarbon radical free of aliphatic unsaturation and having from 1 to 18 inclusive carbon atoms, R is a divalent hydrocarbon radical free of aliphatic unsaturation and having from 1 to 18 inclusive carbon atoms, X is a monovalent hydrolyzable radical, $x$ is an integer of from 0 to 2 inclusive and Y is a free radical activated group having a chain transfer constant greater than $10^{-3}$.

The polymerization of organic vinylic monomers by means of free radical initiators is well known in the art. For example, the organic vinylic monomers can be polymerized by the free radical initiation whereby the free radical initiator can be a peroxide, such as an organic peroxide, ultraviolet light, triphenylmethane, diazonium compounds, persulfates, aliphatic azobisnitriles, heat and high energy radiation. Since these polymerization processes are so well known in the art, there is no need to provide detailed descriptions herein. The polymerizations can be carried out by bulk polymerization, organic solvent polymerization, emulsion polymerization and suspension polymerization. However, the particular polymerization technique should take into consideration the hydrolyzable groups bonded to the silicon atom. Where aqueous systems are to be used the absence of catalytic agents for the hydrolysis of the hydrolyzable groups should be avoided. The particular hydrolyzable group should also be considered. For example, alkoxysilicon compounds are less susceptible to hydrolysis in the absence of a catalyst than most other hydrolyzable groups on silicon. Therefore, in aqueous emulsion and dispersion polymerizations X is preferably alkoxy. However, there is no need to exclude other hydrolyzable groups from polymerizations using water, if there is no desire to retain the hydrolyzable groups in the unreacted state in the resulting polymerized product.

The method of polymerizing the organic vinylic monomers by means of free radical initiation is modified to the extent that there is present during the polymerization an organosilicon compound of a defined class which has a chain transfer constant greater than $10^{-3}$. The presence of this particular organosilicon compound during the free radical polymerization of the organic vinylic monomers results in organic vinylic polymers having silicon functional terminating groups.

The particular class of organosilicon compounds having a chain transfer constant of greater than $10^{-3}$ and suitable for the present invention have a formula $$X_{3-x}R'_xSiRY$$

or $(X_{3-x}R'_xSiRS)_2$ where R' is a monovalent hydrocarbon radical free of aliphatic unsaturation and having from 1 to 18 inclusive carbon atoms, R is a divalent hydrocarbon radical free of aliphatic unsaturation and having from 1 to 18 inclusive carbon atoms, X is a monovalent hydrolyzable radical, $x$ is 0, 1 or 2 and Y is a free radical activated group having a chain transfer constant greater than $10^{-3}$. Examples of R' include methyl, ethyl, propyl, isopropyl, butyl, phenyl, octyl, octadecyl, benzyl, naphthyl, xenyl, cyclopentyl, cyclohexyl, methylcyclohexyl, tolyl, xylyl, 4-isopropylphenyl and 2-phenylpropyl. Examples of R include methylene, ethylene, propylene, butylene, hexylene, octadecylene, phenylene, tolylene, xylene, xenylene, naphthylene, cyclohexylene, $$-CH_2-C_6H_4-CH_2-$$

and $-CH_2CH_2CH(CH_2CH_3)CH_2CH_2-$.

X can be any hydrolyzable group such as halogen atoms such as F, Cl, Br or I; groups of the formula —OZ when Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3-trifluoropropyl or bromocyclohexyl; any hydrocarbon ether radical such as 2-methoxyethyl, 2-ethoxyisopropyl, 2-butoxyisobutyl, p-methoxyphenyl or $-(CH_2CH_2O)_2CH_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; or any N,N-amino radical such as dimethylamino, diethylamino, ethylmethylamino, diphenylamino, or dicyclohexylamino. X can also be any amino radical such as $NH_2$, dimethylamino, diethylamino, methylphenylamino or dicyclohexylamino; any ketoxime radical of the formula $-ON=CM_2$ or $-ON=CM'$ in which M is any monovalent hydrocarbon or halogenated hydrocarbon radical such as those shown for Z above and M' in any divalent hydrocarbon radical both valences of which are attached to the carbon, such as hexylene, pentylene or octylene; ureido groups of the formula $$-N(M)CONM''_2$$

in which M is defined above and M" is H or any of the M radicals; carbamate groups of the formula $$-OOCNMM''$$

in which M and M" are defined above, or carboxylic amide radicals of the formula $-NMC=O(M'')$ in which M and M" are defined above. X can also be the sulfate group or sulfate ester groups of the formula $-OSO_2(OM)$ where M is defined above; the cyano group; the isocyanate group; and the phosphate group or phosphate ester groups of the formula $-OPO(OM)_2$ in which M is defined above.

The term "hydrolyzable group" means any group attached to the silicon which is hydrolyzed by water at room temperature.

Y includes any of the groups which are activated by free radical initiators and have a chain transfer constant greater than $10^{-3}$. For example, Y can be bromide, mercapto and amino. The determination of chain transfer constants is well known in polymer chemistry and the organosilicon compounds of the present invention have chain transfer constants similar to organic compounds of the formula HRY.

The polymerizable or copolymerizable organic vinylic monomers include the styrene class, such as styrene, alpha-methylstyrene, vinyltoluene, 4-bromostyrene, 4-chloro-3-fluorostyrene, 2-chlorostyrene, 2,5-dichlorostyrene, 2,5-difluorostyrene, 2,4-dimethylstyrene, 4-ethoxystyrene, 4-hexyldecylstyrene, 3 - hydroxymethylstyrene, 4-iodostyrene, 4-isopentoxystyrene, 4-nonadecylstyrene, and the like. Other vinyl containing organic monomers include ethylene, propylene, cyclohexene, divinylbenzene, indene, hexadecene, tetrafluoroethylene, vinylchloride, trifluorochloroethylene, allylchloride, vinylidene chloride, vinylidene fluoride, diethyloroethylene, chlorocyclohexene, crotonaldehyde, acrylic aldehyde, cinnamic aldehyde, allyl alcohol, cyclohexenol, 4-methylpenten-3-ol-1, cinnamic alcohol, penten-4-ol-2, acrylic acid, methacrylic acid, crotonic acid, vinyl acetic acid, cinnamic acid, maleic acid, allylethyl ether, methyl acrylate, methyl methacrylate, vinylacetate, allylacetate, crontonamide, acrylamide, cinnamamide, acrylonitrile, methacrylonitrile, cinnamonitrile, vinyldimethylamine, vinylmethyl sulfide, vinyl methyl ether, methylvinyl ketone, allyl acetone, perfluorovinyl methyl ether, allylisocyanate, ethylacrylate, 2-ethyl-hexylacrylate, n-butyl acrylate, methyl-alpha-chloroacrylate, hydroxyethylacrylate, dihydroperfluorobutylacrylate, propylacrylate, isopropylacrylate, calcium acrylate, sodium acrylate, cyclohexylacrylate, dodecylacrylate, isobornylacrylate, hexyldecylacrylate, tetradecylacrylate, dimethacrylate, 2-n-tert-butylaminoethylmethacrylate, 2-butylmethacrylate, glycidylmethacrylate, 2-chloroethylmethacrylate, 3,3-dimethylbutylmethacrylate, 2-ethylhexylmethacrylate, 2-methoxyethylmethacrylate, pentylmethacrylate, ethylmethacrylate, n-butylmethacrylate, isobutylmethacrylate, isopropylmethacrylate, propylmethacrylate, allylbenzoate, vinylbutyrate, vinylstearate, vinylbenzoate, dialkyl fumarates, dialkylmaleates, vinylidene bromide, vinylnaphthylene and vinyl pyridine.

The products prepared by the process described herein, will contain silyl groups in terminal positions. These products can be illustrated as to type by describing some of the reactions believed to take place in the silylating method of the present invention. In the following reactions, I is the initiator and C=C is the organic vinylic monomer.

(1) $I \cdot + C=C \rightarrow IC-C \cdot$
(2) $IC-C \cdot + n(C=C) \rightarrow IC-C(C-C-)_n \cdot$
(3) $IC-C(C-C)_n \cdot + X_{3-x}R'_xSiRY \rightarrow IC-C(C-C)_nRSiR'_xX_{3-x} + Y \cdot$
(4) $Y \cdot + (C=C) \rightarrow YC-C \cdot$
(5) $YC-C \cdot + nC=C \rightarrow YC-C(C-C)_n \cdot$
(6) $2YC-C(C-C)_n \cdot \rightarrow YC-C(C-C)_{2n}C-CY$ Therefore, the product will contain organic vinylic polymers having one silyl group. However, when $$X_{3-x}R'_xSiRSSRSiR_xX_{3-x}$$

is used $\cdot SRSiR'_xX_{3-x}$ will replace $Y \cdot$ in the above equations and the product will contain organic vinylic polymers with one silyl group and organic vinylic polymers with two silyl groups.

The products obtained from the process have hydrolyzable silicon functional groups and therefore further reactions or condensations through these groups provides the organic vinylic polymers with the ability to react at room temperature, to cure at room temperature, to chain extend at room temperature and therefore the thermoplastic organic vinylic polymers have an added dimension. For example, the thermoplastic organic vinylic polymers having silyl groups can be reacted with reactive silicone polymers such as hydroxyl terminated polydimethylsiloxane, hydroxylated organosiloxane resins and the like to provide copolymers which can be used in making paints, coatings and the like. The thermoplastic organic vinylic polymers having the silyl groups show adhesion to ceramics and metallic surfaces.

The following examples are illustrative only and should not be construed as limiting the present invention which is properly delineated in the claims.

EXAMPLE 1

An emulsion of 50.0 g. of styrene, 100 g. of water, 1.0 g. of sodium lauryl sulfate, 0.052 g. of potassium persulfate, 0.052 g. of sodium phosphate and 5.0 g. $\{(CH_3O)_3SiCH_2CH_2CH_2S\}_2$ was stirred under a nitrogen atmosphere at 70° C. for 2 hours and then at 95° C. for 2 hours. A portion of the resulting emulsified polymer was coagulated with $CaCl_2$ to give a cross-linked polymer which had 30 weight percent extractables by using a continuous benzene extraction. The emulsified polymer contained 70 weight percent of the polystyrene molecules with $-SCH_2CH_2CH_2Si(OCH_3)_3$ terminal groups which cross-linked through the silicon-methoxy functionality. The water was removed from a 31 g. portion of the above emulsion polymer by evaporation to which had been added 0.05 g. of stannous octoate as the condensation catalyst. The resulting product was a hard, glassy cross-linked polymer which had only 20 weight percent benzene extractable material. The polymer therefore contained 80 weight percent of the polystyrene molecules with $$-SCH_2CH_2CH_2Si(OCH_3)_3$$

terminal groups which cross-linked through the silicon-methoxy functionality. The chain transfer constant for $\{(CH_3O)_3SiCH_2CH_2CH_2S\}_2$ was $11.8 \times 10^{-3}$.

EXAMPLE 2

Methyl methacrylate was polymerized in sealed ampoules at 79.5°±0.2° C. The polymerization mixture was composed of 5 g. of methyl methacrylate, $8.2 \times 10^{-5}$ g. of azobisisobutyronitrile and the silicon compound defined below in the amount indicated.

| Silicon compound | Chain transfer constant | Amount, g. | Terminating group of polymethylmethacrylate |
|---|---|---|---|
| $(CH_3O)_3SiCH_2CH_2CH_2SH$ | $693 \times 10^{-3}$ | 0.001 | $-SCH_2CH_2CH_2Si(OCH_3)_3$ |
| $\{(CH_3O)_3SiCH_2CH_2CH_2S\}_2$ | $2.58 \times 10^{-3}$ | 0.15 | $-SCH_2CH_2CH_2Si(OCH_3)_3$ |
| 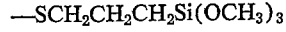 | $2.98 \times 10^{-3}$ | 0.15 |  |

EXAMPLE 3

Styrene was polymerized in sealed ampoules at 79.5 ±0.2° C. The polymerization mixture was composed of 5 g. of styrene, $7.9 \times 10^{-5}$ g. of azobisisobutyronitrile and the silicon compound defined below in the amount indicated.

| Silicon compound | Chain transfer constant | Amount, g. | Terminating group of polystyrene |
|---|---|---|---|
| $(CH_3O)_3SiCH_2CH_2CH_2SH$ | $5,900 \times 10^{-3}$ | $7.85 \times 10^{-5}$ | $-SCH_2CH_2CH_2Si(OCH_3)_3$ |
| $\{(CH_3O)_3SiCH_2CH_2CH_2S\}_2$ | $11.8 \times 10^{-3}$ | 0.078 | $-SCH_2CH_2CH_2Si(OCH_3)_3$ |

EXAMPLE 4

When the following silicon compounds having chain transfer constants greater than $10^{-3}$ are substituted for the silicon compounds in Example 3, polystyrene is obtained having the indicated terminating groups.

| Silicon compound | Terminating group |
|---|---|
| [(CH$_3$O)$_3$Si——S]$_2$ | —S——Si(OCH$_3$)$_3$ |
| Cl(CH$_3$)$_2$SiCH$_2$SH | —SCH$_2$Si(CH$_3$)$_2$Cl |
| (CH$_3$$\overset{O}{\overset{\|}{C}}$O)$_2$(C$_6$H$_5$)SiC$_8$H$_{16}$SH | —SC$_8$H$_{16}$Si(C$_6$H$_5$)(O$\overset{O}{\overset{\|}{C}}$CH$_3$)$_2$ |
| $\left(\begin{array}{c}CH_3\\ \phantom{x}\diagdown\\ \phantom{xx}CHO\\ \phantom{x}\diagup\\ CH_3\end{array}\right)_3$SiCH$_2$CH$_2$CH$_2$Br | —CH$_2$CH$_2$CH$_2$Si$\left(\begin{array}{c}CH_3\\ \diagdown\\ OCH\\ \diagup\\ CH_3\end{array}\right)_3$ |

That which is claimed is:

1. A method of silylating organic vinylic polymers comprising polymerizing organic vinylic monomers by means of free radical initiation in the presence of a compound selected from the group consisting of an organosilicon compound of the formula $X_{3-x}R'_xSiRY$ and $(X_{3-x}R'_xSiRS)_2$ in which R' is a monovalent hydrocarbon radical free of aliphatic unsaturation and having from 1 to 18 inclusive carbon atoms, R is a divalent hydrocarbon radical free of aliphatic unsaturation and having from 1 to 18 inclusive carbon atoms, X is a monovalent hydrolyzable radical, $x$ is an integer of from 0 to 2 inclusive and Y is a free radical activated group having a chain transfer constant greater than $10^{-3}$.

2. The product prepared by the method of claim 1.

3. The method in accordance with claim 1 in which the organosilicon compound has the formula $$X_{3-x}R'_xSiRY$$

4. The method in accordance with claim 3 in which Y is mercapto.

5. The method in accordance with claim 4 in which X is methoxy, R is propylene and $x$ is 0.

6. The method in accordance with claim 3 in which Y is bromine.

7. The method in accordance with claim 6 in which X is methoxy, R is

—CH$_2$— and $x$ is 0.

8. The method in accordance with claim 1 in which the organosilicon compound has a formula $$(X_{3-x}R'_xSiRS)_2$$

9. The method in accordance with claim 8 in which X is methoxy, R is propylene and $x$ is 0.

10. The method in accordance with claim 8 in which X is methoxy, R is

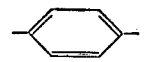

and $x$ is 0.

References Cited
UNITED STATES PATENTS

| | | | |
|---|---|---|---|
| 3,317,461 | 5/1967 | Plueddemann | 260—46.5 |
| 3,324,089 | 6/1967 | Trepka | 260—79.5 |

DONALD E. CZAJA, Primary Examiner

M. I. MARQUIS, Assistant Examiner

U.S. Cl. X.R.

117—123 R, 135.1; 260—29.2 M, 29.2 UA, 465 E, 465 P, 46.5 G, 63 R, 67 UA, 78.4 A, 79.7, 80 PS, 88.3 R, 88.7 R, 89.1, 89.5 R, 89.7 R, 91.1 R, 91.3 R, 91.5, 91.7, 92.1, 92.8 R, 93.5 S, 93.5 W, 93.7, 49.2 R, 94.9 R